May 16, 1950     C. W. COX     2,507,591
FILTER SYSTEM
Filed June 29, 1948
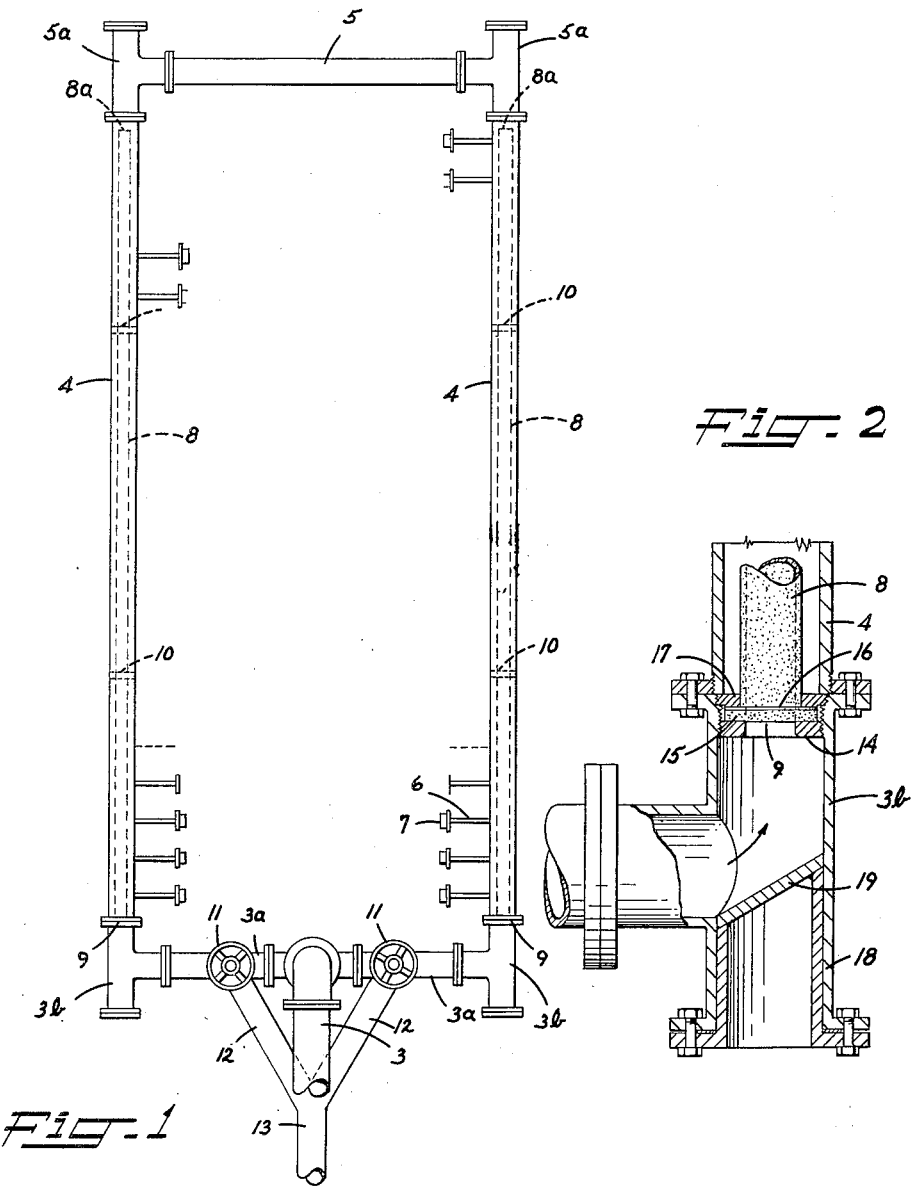
INVENTOR.
CHARLES W. COX
BY
Thomas R O'Malley Patented May 16, 1950

2,507,591

UNITED STATES PATENT OFFICE 2,507,591

FILTER SYSTEM

Charles W. Cox, St. Albans, W. Va., assignor to American Viscose Corporation, Wilmington, Del., a corporation of Delaware Application June 29, 1948, Serial No. 35,952

4 Claims. (Cl. 18—8)

The present invention relates to a filter system, and it is particularly concerned with an improved system especially adapted to the filtration of a film- or filament-forming material, such as viscose, just before it is expressed through the casting die or the spinnerets of a forming machine.

Heretofore, it has been customary to provide individual filters, such as those known as "candle" filters for the individual spinneret supply "rounders" in addition to the line filters. It is a primary object of the present invention to provide a simplified system by which the filtration may be performed by one or both of a pair of filters disposed in the supply header for one or more films or filament-forming machines near the position of formation or extrusion. A further object is to provide a filter system which is capable of efficient backwashing. Other objects and advantages of the invention will be apparent from the drawing and the description thereof which follows:

In the drawing which is illustrative of the invention,

Figure 1 is a plan view of the preferred embodiment, and

Figure 2 is a section of a detail.

As shown in the drawing, a supply line 3 is connected to branch lines 3a which in turn are connected with headers 4. The other ends of the headers are connected by a pipe 5 and T's 5a. The headers 4 are connected by suitable branch conduits, such as lines 6, to consuming devices, such as the spinnerets 7. A hollow tubular filtering element 8 is disposed in each of the headers 4 and may be comprised of a single long porous pipe or a plurality of short sections suitably connected together. These filter pipes are open at one end designated at 9 and closed at the other designated at 8a and they are connected within headers 4 so that their open end 9 is the sole communication with the branch lines 3a. This connection is more clearly shown in Figure 2. Apertured rings or spiders 10 may be disposed within headers 4 to support the filter pipes 8 at intervals along their length. Three-way valves 11 are disposed in branch lines 3a and communicate with lines 12 which terminate in a common discharge line 13 which may be connected to the sewer or to a recovery system. In order to keep viscose from stagnating in the end pipe 5, it is desirable to have a smaller number of spinnerets on one side of the machine than on the other in order to maintain circulation around this end.

The porous pipe may be made of any material whatsoever and it has been found extremely satisfactory to use a sintered stainless steel powder having a mean particle size of 0.0005 to 0.003 inch. The system may employ other metals, such as nickel, silver, copper, depending upon the particular material to be filtered and it is to be understood that while reference has been made primarily to viscose in the preceding description, the system is adapted to the filtration of any material whatsoever. Examples of other materials are casein, cellulose derivatives, such as cellulose acetate, cellulose ethers including those dissolved in organic solvents, those dissolved in water, and those dissolved in aqueous alkaline solutions, resins, such as nylon, saran, polymers of vinyl chloride, acrylonitrile, copolymers thereof with each other and with other materials, such as with vinyl acetate, and the like.

The headers may be connected to other devices for consuming the forming material. For example, each header may be connected to one or more closed extrusion hoppers for producing cellophane films, or they may be connected to one or more devices for forming tubes, rods, sheets, or other shaped articles from the particular forming material supplied.

In operation, the forming material is supplied through the feed duct 3 and proceeds through the branches 3a and T's 3b into the open ends of the tubular filters 8. The sealing means (see Figure 2) at the juncture 9, comprising a ring 14 holding a flange 15 of the pipe 8 against a gasket 16 and a ring 17, prevents any of the forming material from entering the headers without first passing through the walls of the tubular filters. A plug 18 fits in each of the T's 3b and 5a and has a plate 19 for preventing viscose from stagnating in the closed end or branch of the T. Removal of the plug facilitates removal and replacement of the filter system. The filter material passes through the annular space between the external wall of the filter 8 and the internal wall of the header 4 and then through the delivery pipes 6 to the spinnerets 7 or other forming devices depending upon which are provided in the particular machine. In the operation with viscose or other forming material which tends to set up if allowed to stagnate, the relative load upon the two headers is unbalanced so that a portion of the viscose or other material must pass around the end pipe 5 in order to prevent stagnation. This may be accomplished by providing a lesser number of spinnerets on one side of the machine than the other, or by providing an unbalanced delivery requirement on the two headers in any other fashion.

When it is desired to clean the filters, this can be done one at a time merely by turning one of the control valves 11 so as to close that branch 3a containing the valve against the feed pipe 3 and to connect the other side of that branch 3a to the discharge pipe 12. When this is done, assuming for illustration that the valve 11 at the left side of Figure 1 is the one thus turned, the forming material passes through the pipe 3 through the right branch 3a, is filtered by the first tubular filter 8 and proceeds around through the end pipe 5 into the annular space in the left header 4 around the tubular filter therein. It is then forced from the outside to the inside of the second tubular filter and in passing through it backwashes collected foreign bodies and washes them through the left end of branch pipe 3a into discharge pipe 12 which may be conducted to a sewer or to a suitable recovery system. During the backwashing, it is best to discontinue the pumps which supply the spinnerets 7 so that the entire mass of forming material handled during that time is used for washing purposes, but in an optional system, the pumps may be operated on the side which receives the filtered viscose (the right side in the system just described), while the pumps are discontinued on the left header where the forming material charged with foreign matter is present. After first backwashing the filter tube in the left header, that in the right header may be washed in similar fashion by turning the valve 11 on the left to connect feed pipe 3 to the left header 4 and by turning the valve 11 on the right to connect the discharge from the right header to the pipe 12.

Thus, it will be seen that the present system provides for a simple filter system which is particularly adapted to the filtration of the forming material in connection with forming machines, such as machines for spinning artificial filaments or for casting cellophane sheets, tubes, or other filaments, films, tubes, rods and the like. The improved system is readily backwashed without removal of the filter elements. Whereas a plurality of individual filter heads have heretofore been used in the delivery conduits to the individual spinnerets of a spinning machine, the present system replaces such numerous elements with a common unitary filter, thereby greatly simplifying the forming machine and reducing the cost of initial installation and maintenance.

It will be understood that changes and variations may be made without departing from the spirit and scope of the invention as defined in the appended claims.

I claim:

1. A filter system comprising two supply headers, a filter tube having an open end and a closed end in each of the headers, a feed pipe, branch pipes connecting the feed pipe with the open ends of the tubes, and a pipe connecting the ends of the headers adjacent the closed ends of the tubes.

2. A filter system comprising two supply headers, a filter tube having an open end and a closed end in each of the headers, a feed pipe, branch pipes connecting the feed pipe with the open ends of the tubes, a pipe connecting the ends of the headers adjacent the closed ends of the tubes, a discharge pipe connected to each of the branch pipes, and valve means for controlling the flow in the branch pipes and discharge pipes.

3. A spinning machine comprising a plurality of spinnerets for controlling the extrusion of a filament-forming material, said spinnerets being disposed on opposite sides of the machine, a filter system in accordance with claim 1 disposed with the two headers on opposite sides of the machine, and a plurality of delivery pipes connecting the spinnerets to the headers.

4. The method comprising dividing a material into two streams, passing each of the streams through the wall of a filter, and at intervals backwashing the filter by (1) directing the material without division, as a single stream through the wall of one of the filters in the same direction as that taken by one of the divided streams during filtering and then through the wall of the other filter in the opposite direction and (2) subsequently reversing the flow of the material, as a single stream through the filter walls in succession.

CHARLES W. COX.

REFERENCES CITED

The following references are of record in the file of this patent:

UNITED STATES PATENTS

| Number | Name | Date |
| --- | --- | --- |
| 2,078,543 | Salisbury | Apr. 27, 1937 |